United States Patent
Rogers et al.

(10) Patent No.: US 9,354,892 B2
(45) Date of Patent: May 31, 2016

(54) CREATING SIMD EFFICIENT CODE BY TRANSFERRING REGISTER STATE THROUGH COMMON MEMORY

(71) Applicant: ADVANCED MICRO DEVICES, INC., Sunnyvale, CA (US)

(72) Inventors: Timothy G. Rogers, Redmond, WA (US); Bradford M. Beckmann, Redmond, WA (US); James M. O'Connor, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 696 days.

(21) Appl. No.: 13/689,421

(22) Filed: Nov. 29, 2012

(65) Prior Publication Data

US 2014/0149710 A1    May 29, 2014

(51) Int. Cl.
G06F 9/00 (2006.01)
G06F 7/36 (2006.01)
G06F 9/38 (2006.01)

(52) U.S. Cl.
CPC ............ G06F 9/3887 (2013.01); G06F 9/3851 (2013.01)

(58) Field of Classification Search
None
See application file for complete search history.

(56) References Cited

U.S. PATENT DOCUMENTS

| | | | | |
|---|---|---|---|---|
| 5,050,068 A * | 9/1991 | Dollas | ...................... | G06F 8/445 712/206 |
| 7,225,309 B2 * | 5/2007 | DeWitt et al. | ................. | 711/165 |
| 7,447,873 B1 * | 11/2008 | Nordquist | ....................... | 712/22 |
| 7,594,095 B1 * | 9/2009 | Nordquist | ....................... | 712/22 |
| 8,200,940 B1 * | 6/2012 | Lindholm | ....................... | 712/22 |
| 8,381,037 B2 * | 2/2013 | Dewitt et al. | .............. | 714/38.13 |
| 2011/0219208 A1 * | 9/2011 | Asaad | ..................... | G06F 15/76 712/12 |
| 2012/0204014 A1 * | 8/2012 | Leather et al. | ................ | 712/223 |

OTHER PUBLICATIONS

Veynu Narasiman, et al., "Improving GPU Performance via Large Warps and Two-Level Warp Scheduling," http://users.ece.cmu.edu/~omutlu/pub/large-gpu-warps_micro11.pdf, accessed Nov. 29, 2012.
Jiayuan Meng, et al., "Dynamic Warp Subdivision for Integrated Branch and Memory Divergence Tolerance," http://www.cs.virginia.edu/~skadron/Papers/meng_dws_isca10.pdf, accessed Nov. 29, 2012.
Michael Steffen, et al., "Improving SIMT Efficiency of Global Rendering Algorithms With Architectural Support for Dynamic Micro-Kernels," http://rcl.ece.iastate.edu/sites/default/files/papers/SteZam10B.pdf, accessed Nov. 29, 2012.
Wilson W. L. Fung, et al., "Thread Block Compaction for Efficient SIMT Control Flow," http://137.82.61.1/~aamodt/papers/wwlfung.hpca2011.pdf, accessed Nov. 29, 2012.
Wilson W. L. Fung, et al., "Dynamic Warp Formation and Scheduling for Efficient GPU Control Flow," http://137.82.61.1/~aamodt/papers/wwlfung.micro2007.pdf, accessed Nov. 29, 2012.

* cited by examiner

Primary Examiner — Michael Sun
(74) Attorney, Agent, or Firm — Park, Vaughan, Fleming & Dowler LLP (57) ABSTRACT

Methods, media, and computing systems are provided. The method includes, the media are configured for, and the computing system includes a processor with control logic for allocating memory for storing a plurality of local register states for work items to be executed in single instruction multiple data hardware and for repacking wavefronts that include work items associated with a program instruction responsive to a conditional statement. The repacking is configured to create repacked wavefronts that include at least one of a wavefront containing work items that all pass the conditional statement and a wavefront containing work items that all fail the conditional statement.

27 Claims, 4 Drawing Sheets

CREATING SIMD EFFICIENT CODE BY TRANSFERRING REGISTER STATE THROUGH COMMON MEMORY

TECHNICAL FIELD

The technical field relates generally relates to constructing software programs, and more particularly relates to constructing software programs to be more efficient on single instruction multiple data hardware.

BACKGROUND

The desire to use a graphics processing unit (GPU) for general computation has become much more pronounced recently due to the GPU's performance per unit power and/or cost. GPUs, however, have traditionally operated in a constrained programming environment available primarily for the acceleration of graphics. With the advent of multi-vendor supported OpenCL.®. and DirectCompute.®., standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) programming model, (iv) compiling to multiple target instruction set architectures, and (v) providing quality of service (QoS) guarantees between processes, (ISAs)—all while minimizing power consumption.

In another example, computational inefficiencies may arise in existing computing systems when each of the threads in a wavefront, executing the same software program on a GPU, encounter conditional code. Some threads may evaluate the condition as true and other threads may evaluate the condition as false. When conditional sections of code become more complex or include loops with different iteration counts per thread, the threads in the wavefront diverge and may never reconverge, which can cause significant performance loss. In a worst case scenario, for example, a processor may execute only one thread at a time instead of a full wavefront. Thus, if the wavefront includes 64 threads, the processor operates at only 1/64 of peak performance.

SUMMARY OF EMBODIMENTS

Methods, media, and computing systems are provided. In some embodiments, a method allocating memory for storing a plurality of local register states for work items to be executed in single instruction multiple data hardware and repacking wavefronts that include work items associated with a program instruction responsive to a conditional statement. The repacking is configured to create repacked wavefronts that include at least one of a wavefront containing work items that all pass the conditional statement and a wavefront containing work items that all fail the conditional statement.

In some embodiments, a method includes allocating local data store memory for storing a plurality of local register states for work items to be executed in single instruction multiple data hardware, allocating a state pointer stack that includes a plurality of state pointer entries that are each associated with a respective entry of the plurality of local register states, generating a dereference to one of the state pointer entries responsive to a reference to a local variable, sorting the state pointer entries based on results of the conditional statement, and repacking wavefronts that include work items associated with a program instruction responsive to a conditional statement. The repacking is configured to create repacked wavefronts based on the sorted state pointer entries that include at least one of a wavefront containing work items that all pass the conditional statement and a wavefront containing work items that all fail the conditional statement.

In some embodiments, a non-transitory computer readable medium stores control logic. The control logic includes control logic instructions to allocate memory for storing a plurality of local register states for work items to be executed in single instruction multiple data hardware and repack wavefronts that include work items associated with a conditional statement program instruction, wherein the repacking creates repacked wavefronts that include at least one of a wavefront containing work items that all pass the conditional statement and a wavefront containing work items that all fail the conditional statement.

In some embodiments, a computing system includes a processor with control logic. The control logic is configured to allocate memory for storing a plurality of local register states for work items to be executed in single instruction multiple data hardware and repack wavefronts that include work items associated with a program instruction responsive to a conditional statement. The repacking is configured to create repacked wavefronts that include at least one of a wavefront containing work items that all pass the conditional statement and a wavefront containing work items that all fail the conditional statement.

BRIEF DESCRIPTION OF THE DRAWINGS

Advantages of the embodiments disclosed herein will be readily appreciated, as the same becomes better understood by reference to the following detailed description when considered in connection with the accompanying drawings wherein.

DETAILED DESCRIPTION

The following detailed description is merely exemplary in nature and is not intended to limit application and uses. As used herein, the word "exemplary" means "serving as an example, instance, or illustration." Thus, any embodiments described herein as "exemplary" are not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computing system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computing systems and other functional aspects of a computing system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in the embodiments disclosed herein.

In general, methods, system, and media are provided for constructing software into single instruction multiple data (SIMD) efficient code. For example, a method is provided for re-arranging which work items execute on which physical lanes of a SIMD array, as will be described below.

Figure 1:
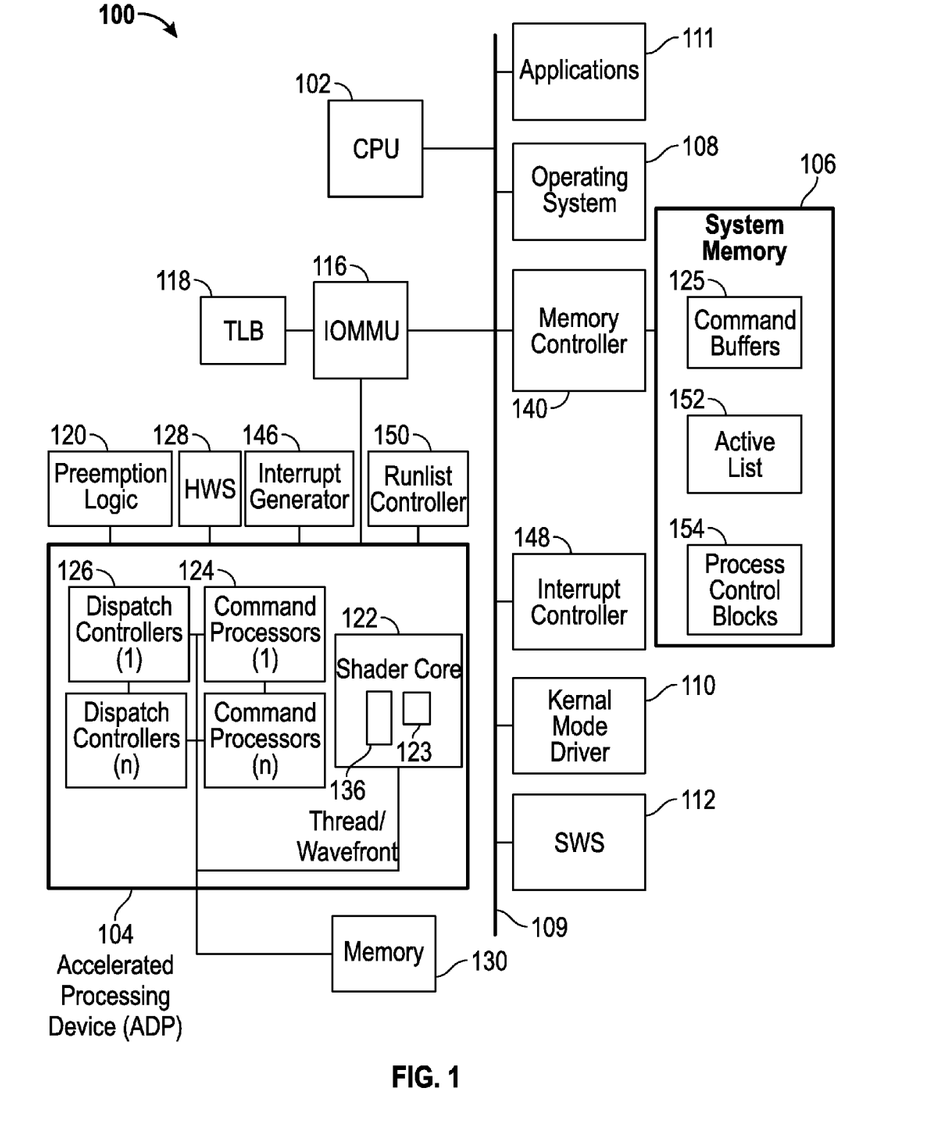
FIG. 1 is a simplified block diagram of a computing system according to some embodiments.

FIG. 1 is an exemplary illustration of a unified computing system 100 including a central processing unit (CPU) 102 and an accelerated processing device (APD) 104. CPU 102 may include one or more single or multi core CPUs. An APD may be any cooperating collection of hardware and/or software that performs functions and computations associated with accelerating graphics processing tasks, data parallel tasks, or nested data parallel tasks in an accelerated manner with respect to resources such as conventional CPUs, conventional GPUs, and/or combinations thereof. Although GPUs, accelerated processing units (APUs), and general purpose use of the graphics processing unit (GPGPU) are commonly used terms in this field, the expression "accelerated processing device (APD)" as used herein is a broader expression. In the example provided, the system 100 is formed on a single silicon die or package that combines CPU 102 and APD 104 to provide a unified programming and execution environment. This environment enables the APD 104 to be used as fluidly as the CPU 102 for some programming tasks. In some embodiments, the CPU 102 and the APD 104 are formed separately and mounted on the same or different substrates.

In the embodiment provided, system 100 also includes a memory 106, an operating system 108, and a communication infrastructure 109. The operating system 108 and the communication infrastructure 109 are discussed in greater detail below.

The system 100 further includes a kernel mode driver (KMD) 110, a software scheduler (SWS) 112, and a memory management unit 116, such as an input/output memory management unit (IOMMU). Components of system 100 may be implemented as hardware, firmware, software, or any combination thereof. In some embodiments the system 100 includes one or more software, hardware, and firmware components in addition to or different from those shown in FIG. 1. A driver, such as KMD 110, communicates with a device through an interconnect or communications subsystem. When a calling program invokes a routine in the driver, the driver issues commands to the device. Once the device sends data back to the driver, the driver may invoke routines in the original calling program. In general, drivers are hardware-dependent and operating-system-specific to provide the interrupt handling required for any necessary asynchronous time-dependent hardware interface.

CPU 102 may include (not shown) one or more of a control processor, field programmable gate array (FPGA), application specific integrated circuit (ASIC), or digital signal processor (DSP). CPU 102 executes at least a portion of the control logic that controls the operation of computing system 100. For example, the CPU 102 executes the operating system 108, KMD 110, SWS 112, and applications 111. In the example provided, the CPU 102 initiates and controls the execution of applications 111 by distributing the processing associated with applications 111 across the CPU 102 and other processing resources, such as the APD 104.

APD 104 executes commands and programs for selected functions, such as graphics operations and other operations that may be particularly suited for parallel processing. In general, APD 104 is frequently used for executing graphics pipeline operations, such as pixel operations, geometric computations, and rendering an image to a display. In some embodiments, APD 104 also executes compute processing operations (e.g., those operations unrelated to graphics such as video operations, physics simulations, computational fluid dynamics, etc.), based on commands or instructions received from CPU 102. For example, commands may be considered special instructions that are not typically defined in the instruction set architecture (ISA). A command may be executed by a special processor, such a dispatch processor, command processor, or network controller. In some embodiments instructions may be considered, for example, a single operation of a processor within a computer architecture. In some embodiments that use two sets of ISAs, some instructions are used to execute x86 programs and some instructions are used to execute kernels on an APD compute unit.

APD 104 may include compute units, such as one or more SIMD processing cores. In the example provided, the compute units are referred to collectively as shader core 122. In the embodiments described herein a SIMD is a pipeline or programming model where a kernel is executed concurrently on multiple processing elements. The processing elements have independent data and a shared program counter to execute an identical set of instructions. The use of predication enables work items to participate or not participate for each issued command. Each APD 104 compute unit may include one or more scalar and/or vector floating-point units, arithmetic and logic units (ALUs). In the example provided, the ALUs are arranged into four SIMD arrays that each include 16 lanes (processing elements). Each SIMD array executes a single instruction across the 16 lanes to a block of 16 work items. It should be appreciated that other configurations or grouping of ALUs, SIMD arrays, and lanes per array may be utilized. Each work item is mapped to a lane during execution. The APD compute unit may include special purpose processing units (not shown), such as inverse-square root units and sine/cosine units. In the example provided, the shader core 122 includes a local data store (LDS) memory 123. The LDS is a high-speed, low-latency memory private to each compute unit. The LDS is a full gather/scatter model so that a work-group can write anywhere in an allocated space.

Some graphics pipeline operations, such as pixel processing and other parallel computation operations, may require that the same command stream or compute kernel be performed on streams or collections of input data elements. Respective instantiations of the same compute kernel may be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In the embodiment provided, each compute unit (e.g., SIMD processing core) may execute a respective instantiation of a particular work item to process incoming data. A work item is one of a collection of parallel executions of a kernel invoked on a device by a command. A work item may be executed by one or more processing elements as part of a work-group executing on a compute unit. A work item is distinguished from other executions within the collection by a global ID and a local ID. A subset of work items in a workgroup that execute simultaneously together on a SIMD may be referred to as a wavefront 136. The width of a wavefront is a characteristic of the hardware of the compute unit (e.g., SIMD processing core). As referred to herein, a workgroup is a collection of related work items that execute on a single compute unit. In the embodiment provided, all wavefronts from a workgroup are processed on the same SIMD processing core. Wavefronts may also be referred to as warps, vectors, or threads.

An execution mask and work item predication are used to enable divergent control flow within a wavefront, where each individual work item may take a unique code path through the kernel. Shader core 122 may simultaneously execute a predetermined number of wavefronts 136, where each wavefront 136 includes multiple work items. Code in each wavefront 136 may include conditional code with conditional branches. In some embodiments, conditional branches in a SIMD processor are implemented using predication to enable only a subset of the SIMD processor's threads to execute the conditional code. When conditional sections of code become more complex or include loops with different iteration counts per thread, the threads in the wavefront diverge (e.g., the threads in the wavefront do not simultaneously execute the same instruction) and may never reconverge, which can cause significant performance loss. For example, when all threads in a wavefront execute the same instruction, only one clock cycle is needed to process the instruction for all threads in the wavefront. Multiple clock cycles may be needed, however, if the threads in the wavefront are not concurrently executing the same instruction. In a worst case scenario, the SIMD processor may execute only one thread at a time instead of a full wavefront. Thus, if the wavefront includes 64 threads, the SIMD processor will operate at 1/64 of peak performance. Therefore, it is computationally advantageous to concurrently execute as many threads as possible.

Within the system 100, APD 104 includes graphics memory 130. It should be appreciated that graphics memory 130 is not limited to graphics only use. In some embodiments, APD 104 includes access to graphics memory 130, as well as access to the memory 106. In some embodiments, APD 104 includes access to dynamic random access memory (DRAM) or other such memories (not shown) that are attached directly to the APD 104 and are separate from memory 106.

In the embodiment provided, APD 104 further includes one or "n" number of command processors (CPs) 124. CP 124 controls the processing within APD 104, retrieves commands to be executed from command buffers 125 in memory 106, and coordinates the execution of those commands on APD 104. CP 124 may be implemented in hardware, firmware, software, or a combination thereof. In some embodiments, CP 124 is implemented as a reduced instruction set computer (RISC) engine with microcode for implementing logic, including scheduling logic.

A plurality of command buffers 125 may be maintained with each process scheduled for execution on the APD 104. In some embodiments, CPU 102 inputs commands based on applications 111 into the appropriate command buffers 125. As referred to herein, an application is the combination of the program parts that will execute on the compute units within the CPU 102 and APD 104.

APD 104 further includes one or "n" number of dispatch controllers (DCs) 126. As used herein, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 is implemented as part of CP 124.

System 100 further includes a hardware scheduler (HWS) 128 for selecting a process from a run list 150 for execution on APD 104. HWS 128 may select processes from run list 150 using a round robin method, priority level, or based on other scheduling policies. The priority level, for example, may be dynamically determined. HWS 128 may also include functionality to manage the run list 150 by adding new processes and deleting existing processes from run-list 150. The run list management logic of HWS 128 is sometimes referred to as a run list controller (RLC).

In some embodiments, when HWS 128 initiates the execution of a process from run list 150, CP 124 begins retrieving and executing commands from the corresponding command buffer 125. In some instances, CP 124 may generate one or more commands to be executed within APD 104, which correspond with commands received from CPU 102. CP 124, together with other components, implements a prioritizing and scheduling of commands on APD 104 in a manner that improves or maximizes the utilization of the resources of APD 104 and/or system 100.

APD 104 may have access to or may include an interrupt generator 146. Interrupt generator 146 may be configured by APD 104 to interrupt the operating system 108 when interrupt events, such as page faults, are encountered by APD 104. For example, APD 104 may rely on interrupt generation logic within IOMMU 116 to create the page fault interrupts noted above.

In the example provided, APD 104 further includes preemption and context switch logic 120 for preempting a process currently running within shader core 122. Context switch logic 120 includes functionality to stop the process and save a current state (e.g., shader core 122 state, and CP 124 state). As referred to herein, the term state may include an initial state, an intermediate state, and/or a final state. An initial state is a starting point for a machine to process an input data set according to a programming order to create an output set of data. There is an intermediate state, for example, that is stored at several points to enable the processing to make forward progress. This intermediate state is sometimes stored to allow a continuation of execution at a later time when interrupted by another process. There is also a final state that may be recorded as part of the output data set Preemption and context switch logic 120 may also include logic to context switch another process into the APD 104. The functionality to context switch another process into running on the APD 104 may include instantiating the process (e.g., through the CP 124 and DC 126 to run on APD 104), restoring any previously saved state for that process, and starting execution of the process.

In the example provided, memory 106 includes non-persistent memory, such as DRAM (not shown). Memory 106 may store processing logic instructions, constant values, variable values during execution of portions of applications or other processing logic, or other desired information. For example, parts of control logic to perform one or more operations on CPU 102 may reside within memory 106 during execution of the respective portions of the operation by CPU 102. During execution, respective applications, operating system functions, processing logic commands, and system software may reside in memory 106. Control logic commands that are fundamental to operating system 108 generally reside in memory 106 during execution. Other software commands, (e.g., kernel mode driver 110 and software scheduler 112) may also reside in memory 106 during execution of system 100.

In the embodiment provided, memory 106 includes command buffers 125 that are used by CPU 102 to send commands to APD 104. Memory 106 also contains process lists and process information (e.g., active list 152 and process control blocks 154). These lists as well as the process information are used by scheduling software executing on CPU 102 to communicate scheduling information to APD 104 and/or related scheduling hardware. Access to memory 106 may be managed by a memory controller 140, which is coupled to memory 106. For example, requests from CPU 102 or other devices for reading from or for writing to memory 106 are managed by the memory controller 140.

IOMMU 116 is a multi-context memory management unit. As used herein, context may be considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. IOMMU 116 includes logic to perform virtual to physical address translation for memory page access for devices, such as APD 104. IOMMU 116 includes logic to generate interrupts when, for example, a page access by a device such as APD 104 results in a page fault. IOMMU 116 may also include, or have access to, a translation lookaside buffer (TLB) 118. TLB 118, as an example, may be implemented in a content addressable memory (CAM) to accelerate translation of logical (i.e., virtual) memory addresses to physical memory addresses for requests made by APD 104 for data in memory 106.

In the example provided, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. Communications infrastructure 109 may also include an Ethernet network or any other suitable physical communications infrastructure that satisfies an application's data transfer rate requirements. Communication infrastructure 109 includes the functionality to interconnect components, including components of computing system 100.

The operating system 108 in the example provided includes functionality to manage the hardware components of system 100 and to provide common services. In some embodiments, operating system 108 executes on CPU 102 and provides common services. The common services may include, for example, scheduling applications for execution within CPU 102, fault management, interrupt service, as well as processing input and output of other applications. In some embodiments, operating system 108 invokes an appropriate interrupt handling routine based on interrupts generated by an interrupt controller, such as interrupt controller 148. For example, upon detecting a page fault interrupt, operating system 108 may invoke an interrupt handler to initiate loading of the relevant page into memory 106 and to update corresponding page tables.

Operating system 108 may also include functionality to protect system 100 by mediating access to hardware components through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

In some embodiments, applications 111 include various programs or commands to perform user computations that are also executed on CPU 102. CPU 102 sends selected commands for processing on the APD 104. KMD 110 may implement an application program interface (API) through which CPU 102 or applications executing on other logic may invoke APD 104 functionality. For example, KMD 110 may enqueue commands from CPU 102 to command buffers 125 from which APD 104 will subsequently retrieve the commands. Additionally, KMD 110 together with SWS 112 may perform scheduling of processes to be executed on APD 104. SWS 112, for example, may include logic to maintain a prioritized list of processes to be executed on the APD 104. In some embodiments, applications executing on CPU 102 entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

It should be appreciated that computing system 100 may include more or fewer components than shown in FIG. 1. For example, computing system 100 may include one or more input interfaces, non-volatile storage, one or more output interfaces, network interfaces, and one or more displays or display interfaces.

Methods and computer program products are disclosed herein for improving divergent branch execution in a SIMD processor. In general, the exemplary computing system 100 remaps which work items are mapped to which lanes of the SIMD hardware to improve hardware utilization. For example, in an embodiment computing system 100 stores the live register state for each SIMD lane in a memory space shared by the workgroup. Computing system 100 then chooses which live state each physical lane operates on via a pointer into a common memory. Accordingly, the work items included in each wavefront may be re-arranged to maximize the number of work items in each wavefront that are executing the same instruction. Therefore, fewer clock cycles are required to execute each wavefront and efficiency is improved.

Figure 2:
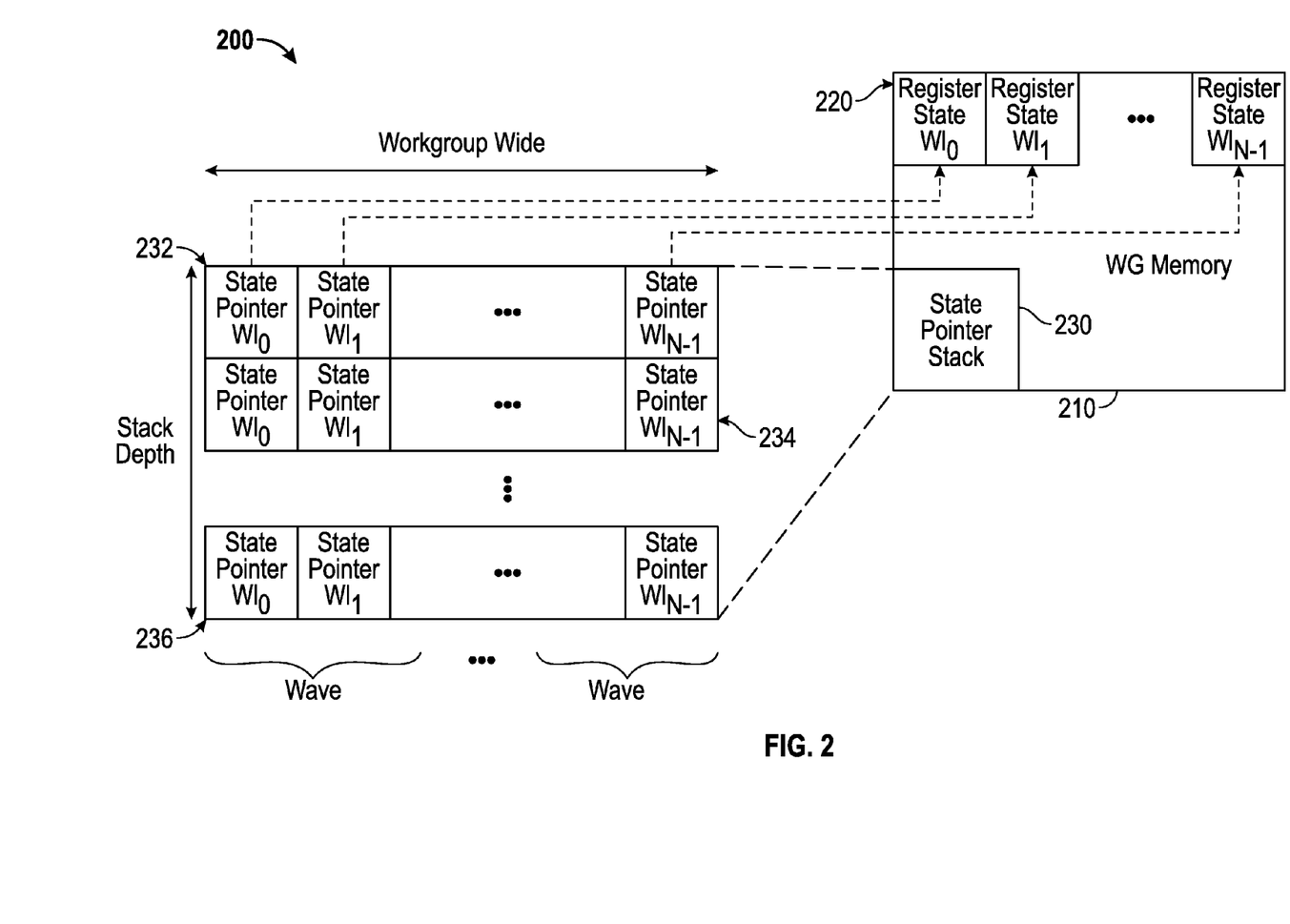
FIG. 2 is a simplified block diagram of a memory configuration according to some embodiments.

Referring now to FIG. 2, a schematic illustration of a memory configuration 200 is shown. In the example provided, the memory configuration 200 is implemented in a workgroup memory 210. The workgroup memory 210 may be a portion of the LDS memory 123, a cache memory, the memory 130, or any other memory that all lanes of a workgroup can access.

Stored in the workgroup memory 210 are a plurality of register states 220 and a state pointer stack 230. The register states 220 each store a respective work item (WI) register state (i.e., values in registers associated with a lane of the SIMD hardware). In the example provided, there is one register state for each work item in a representative work group.

The state pointer stack 230 includes a plurality of stack levels represented by a first stack level 232, a second stack level 234, and an Nth stack level 236. Each stack level of the state pointer stack includes a plurality of state pointer entries represented by a first state pointer entry 240 and a second state pointer entry 242. Each state pointer entry references a respective register state stored in the register states 220. The pointer entries of the state pointer stack are re-arranged at each stack level according to the methods of FIG. 3 and FIG. 4, as described below. Accordingly, work items that follow a similar work flow path through the code may be executed on contiguous physical lanes, thus improving SIMD efficiency.

Figure 3:
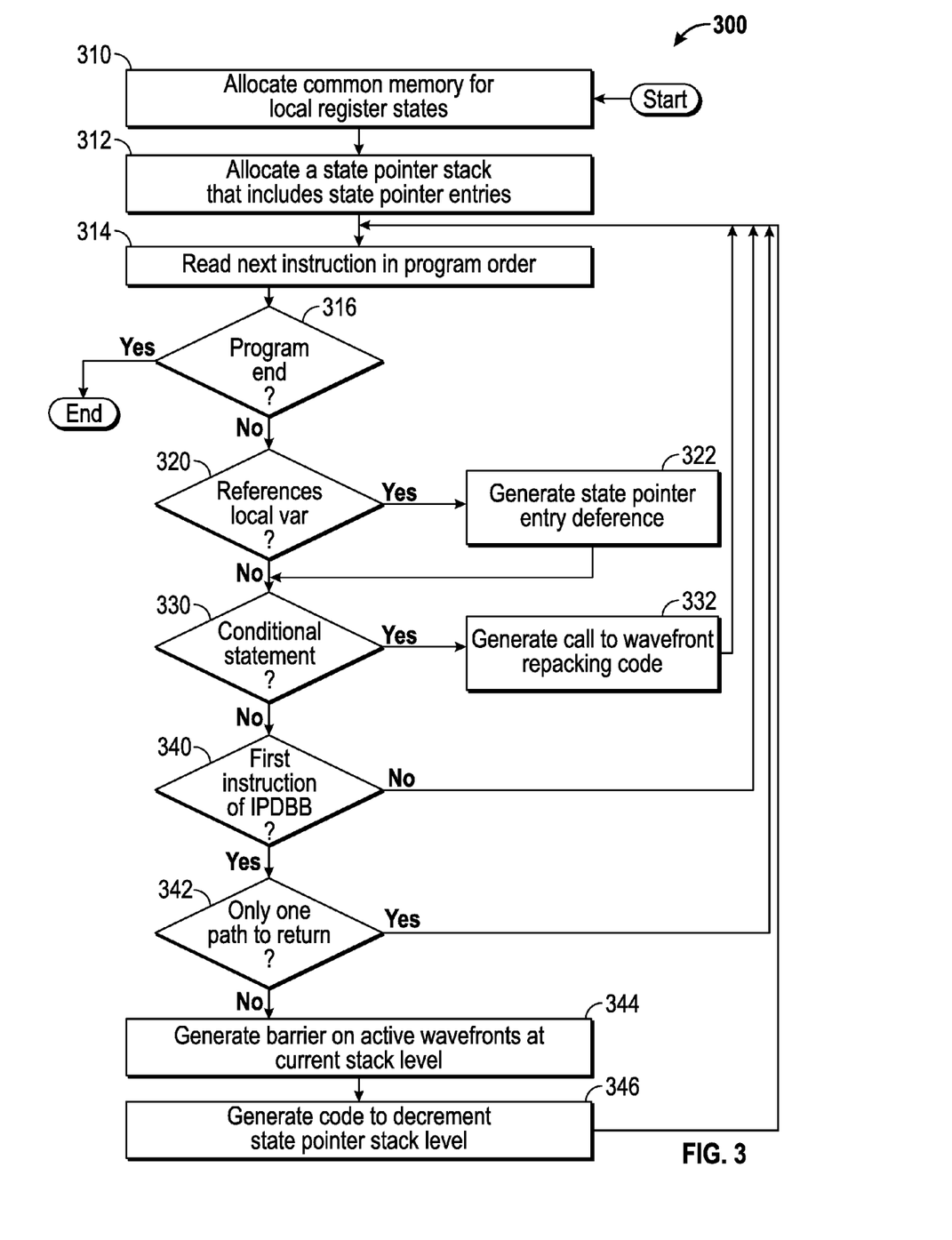
FIG. 3 is a flow diagram illustrating a method of constructing a software program according to some embodiments.

Referring now to FIG. 3, operations 300 of a software program with SIMD efficient code are illustrated. For example, operations 300 may be performed by a compiler for execution on the system 100, an application, driver software, or a user of the system 100. In some embodiments operations 300 are performed to modify an existing program. In some embodiments operations 300 are performed during initial creation of the software program by a programmer.

At block 310 code allocates common memory for local register states. The local register states include a number of entries that is equal to the width of a workgroup that is to be re-arranged according to the operations 300. For example, the register states 220 in the workgroup memory 210 may be allocated for writing out data from the workgroups.

At block 312 allocating a state pointer stack in common memory is performed. For example, block 312 allocates the state pointer stack 230 in the workgroup memory 210.

The next instruction in the software program is read at block 314 and the operations 300 determine whether the software program has ended at block 316. When the software program has not ended, block 320 determines whether the instruction references a local variable. When the instruction does reference a local variable, a respective state pointer entry dereference is generated at block 322 to replace the local variable reference. In other words, when the instruction references a live state of a work item, the operations 300 may refer to the register states 220 in the workgroup memory 210 rather than referring to the local variable register of the work item.

Figure 4:
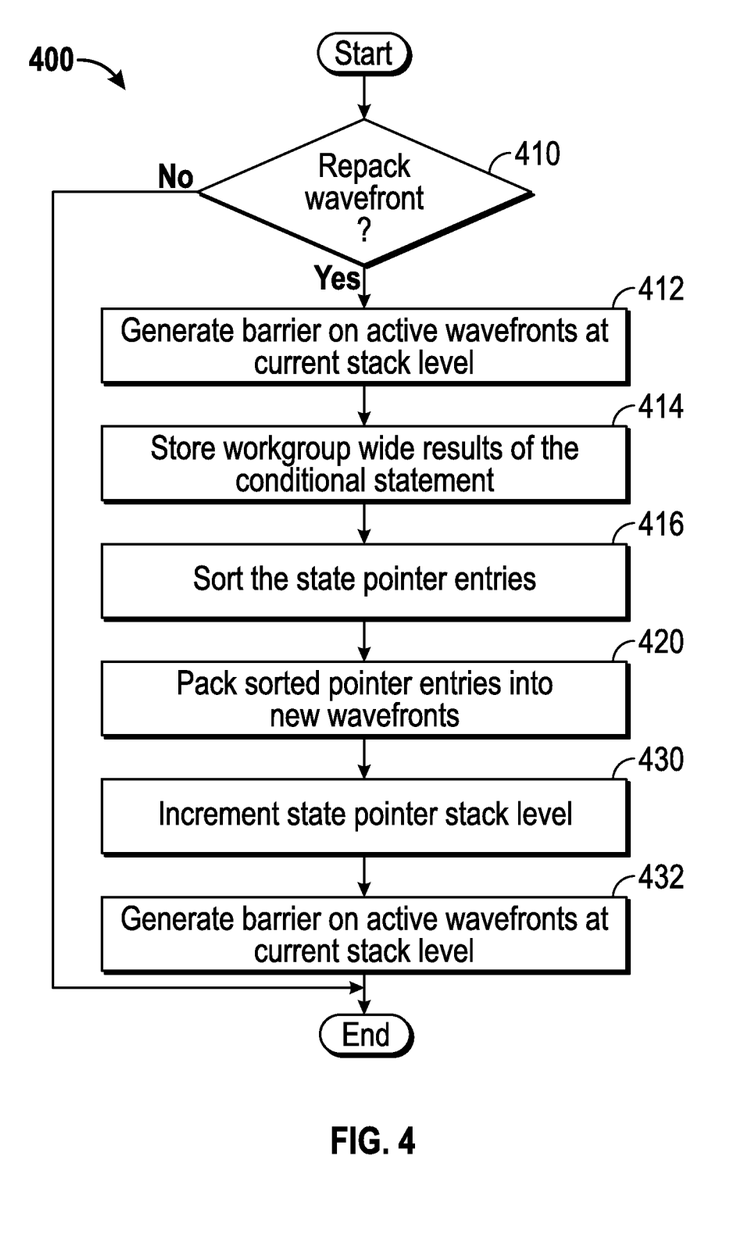
FIG. 4 is a flow diagram illustrating a method of repacking wavefronts according to some embodiments.

Operations 300 determine whether the instruction is a conditional statement in block 330. When the instruction is a conditional statement, operations 300 perform block 332 to generate a call to the wavefront repacking code that is illustrated in FIG. 4, as will be described below. When branches diverge during execution of conditional code, some lanes of execution in the SIMD hardware are disabled. Disabling lanes reduces performance and utilization of the hardware. Accordingly, repacking the wavefronts to re-arrange work items to execute on contiguous physical lanes may improve performance and utilization of the hardware.

When the instruction is not a conditional statement, operations 300 determine whether the instruction is the first instruction of an immediate post dominator basic block (IPDBB) at block 340. The IPDBB is the first piece of code that every work item executes upon reconverging. When the instruction is not an IPDBB, operations 300 return to block 314 to examine a new instruction. When the instruction is an IPDBB, block 342 determines whether the IPDBB has only one path to return. When there is only one path to return, operations 300 return to block 314 to examine a new instruction. When there is more than one path to return, a barrier is generated on active wavefronts at this stack level in block 344. The barrier requests that all work items in a work group reach the point in the code marked by the barrier in order to synchronize the work items. Block 346 generates code to decrement the register state pointer stack level. For example, block 346 may decrement the pointer stack level from the second pointer stack level 234 to the first pointer stack level 232. Accordingly, blocks 340, 342, 344, and 346 may be performed to determine when divergent code reconverges, and return the arrangement of work items in the lanes to a previous arrangement. Therefore, the state pointer stack 230 is able to track nested if statements and return to a previous packing arrangement when work items reconverge.

Referring now to FIG. 4, operations 400 which repack wavefronts are illustrated. Operations 400 are performed, for example, when operations 300 perform block 332. At block 410 the operations 400 determine whether the wavefronts are to be repacked. The determination may be made based on various criteria. For example, the criteria may include a threshold value of threads active in the wavefront (i.e., only reform the wavefront if more than X work items are diverging). Another exemplary criterion is a memory affinity of each work item, so that work items are packed together into the same wavefront when hardware detects that the work items in various wavefronts are operating on similar global memory addresses. Yet another criterion may be divergence of the workgroup at large, so that the wavefronts are re-formed only when the whole workgroup is significantly diverged. Yet another criterion may be a relative resource use cost of running the repacking code. For example, the cost may be determined by assigning static values to instructions in the branch hammock (for example 4 cycles for an ALU operation and 500 cycles for a memory operation) and weight the value of executing these instructions in a diverged state compared with the cost of running the repacking code. When the cost of reforming the wavefronts is deemed worthwhile, the repacking code is executed. It should be appreciated that additional or fewer criteria may be implemented to determine whether the wavefront are to be repacked.

When block 410 determines that the wavefront are to be repacked, a barrier on active wavefronts at the current state pointer stack level is generated in block 412. Accordingly, work items are synchronized. At block 414 the workgroup wide results of the conditional statement operations are stored in the workgroup memory 210. The register state pointers are sorted at block 416 based on the results of the conditionals that were stored in block 414. In some embodiments, sorting is accelerated with support from hardware in the system 100. In some embodiments, heuristics are used to determine the optimal arrangement of which lane gets which data to reduce branch and/or memory divergence.

At block 420 the sorted state pointers are packed into new wavefronts and stored in the next stack level of the state pointer stack 230. For example, block 420 may pack the state pointers that pass the conditional statement in a lower section of the stack level and pack the state pointers that fail the conditional statement in an upper section of the stack level. When there are enough work items taking each branch of the divergent code, then a wavefront containing work items that all pass the conditional statement and/or a wavefront containing work items that all fail the conditional statement will be packed. In the example provided, the state pointers are sorted across multiple workgroups. The sorted and packed state pointers permit contiguous lanes of the SIMD array to use the register states from non-contiguous entries of the register states 220. Execution of sorted work items on contiguous lanes reduces the number of lanes disabled by reducing the variety of instructions executed across a wavefront.

The stack level of the state pointer stack 230 is incremented in block 430. A barrier is generated on active wavefronts at the current stack depth in block 432 to synchronize the work items.

The operations illustrated in FIG. 3 and FIG. 4 may be governed by instructions that are stored in a non-transitory computer readable storage medium and that are executed by at least one processor of the computing system 100. Each of the operations shown in FIG. 3 and FIG. 4 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The provided method and storage medium have several beneficial attributes that promote increased performance of single program multiple data (SPMD) code on SIMD hardware. For example, the methods support cross lane data movement, achieve goals without complicated hardware support, dynamically make decisions on when to repack, include repacking metrics separate from branch divergence (e.g., memory divergence characteristics), and decreases the size of the register file by storing the bulk of state data in the LDS memory. Furthermore, the present methods and media do not require any special wavefront formation hardware, do not introduce a new memory space to move register state, includes a number of heuristics evaluated in software to determine if a wavefront are to be re-arranged, does not introduce the overhead of calling micro-kernels.

While at least one exemplary embodiment has been presented in the foregoing detailed description of the disclosed embodiments, it should be appreciated that a vast number of variations exist. It should also be appreciated that the exemplary embodiment or exemplary embodiments are only examples, and are not intended to limit the scope, applicability, or configuration of the disclosed embodiments in any way. Rather, the foregoing detailed description will provide those skilled in the art with a convenient road map for implementing the disclosed embodiments, it being understood that various changes may be made in the function and arrangement of elements of the disclosed embodiments without departing from the scope of the disclosed embodiments as set forth in the appended claims and their legal equivalents.

What is claimed is:

1. A method for operating a computing system, the method comprising:
    storing, in a memory, a plurality of register states, each register state associated with a corresponding one of a plurality of work items to be executed in single instruction multiple data hardware;
    generating a state pointer stack, the state pointer stack comprising one or more levels of state pointer entries, each state pointer entry associated with a corresponding one of the work items and indicating a respective entry of the local register states;
    analyzing a conditional statement for at least some of the work items; and
    repacking wavefronts that include the work items based on a result of the analyzing, wherein the repacking comprises rearranging the state pointer entries in one or more levels of the state pointer stack to cause the work items to be executed in a corresponding order.

2. The method of claim 1 further comprising:
    generating a dereference to one of the state pointer entries responsive to a reference to a local variable.

3. The method of claim 2 wherein repacking the wavefronts includes incrementing a level of the state pointer stack.

4. The method of claim 3 further comprising determining whether the program instruction is a first instruction of an immediate post dominator basic block.

5. The method of claim 4 further comprising decrementing the level of the state pointer stack when the program instruction is the first instruction of the immediate post dominator basic block.

6. The method of claim 1 wherein the repacking comprises:
    packing the rearranged state pointer entries into the repacked wavefronts.

7. The method of claim 1 wherein the repacking further comprises repacking based on at least one of a threshold value of threads active in the wavefronts, a memory affinity of each work item, an amount of divergence of a workgroup, and a relative resource use cost of running the repacking code.

8. The method of claim 1 wherein storing the plurality of local register states includes allocating local data store memory for storing the plurality of local register state.

9. A method for operating a computing system, the method comprising:
    allocating local data store memory for storing a plurality of local register states for work items to be executed in single instruction multiple data hardware;
    allocating a state pointer stack that includes a plurality of state pointer entries that are each associated with a respective entry of the plurality of local register states;
    generating a dereference to one of the state pointer entries responsive to a reference to a local variable;
    sorting the state pointer entries based on results of a conditional statement; and
    repacking wavefronts that include work items associated with a program instruction responsive to the conditional statement, wherein the repacking is configured to create repacked wavefronts based on the sorted state pointer entries that include at least one of a wavefront containing work items that all pass the conditional statement and a wavefront containing work items that all fail the conditional statement.

10. The method of claim 9 wherein the repacking the wavefronts includes incrementing a level of the state pointer stack.

11. The method of claim 10 further comprising determining whether the program instruction is a first instruction of an immediate post dominator basic block and decrementing the level of the state pointer stack when the program instruction is the first instruction of the immediate post dominator basic block.

12. The method of claim 9 wherein the repacking further comprises repacking based on at least one of a threshold value of threads active in the wavefronts, a memory affinity of each work item, an amount of divergence of a workgroup, and a relative resource use cost of running the repacking code.

13. A non-transitory computer readable medium storing control logic, the control logic including control logic instructions to:
    store, in a memory, a plurality of register states, each register state associated with a corresponding one of a plurality of work items to be executed in single instruction multiple data hardware;
    generate a state pointer stack, the state pointer stack comprising one or more levels of state pointer entries, each state pointer entry associated with a corresponding one of the work items and indicating a respective entry of the local register states;

analyze a conditional statement for at least some of the work items; and repack wavefronts that include the work items based on a result of the analyzing, wherein the repacking comprises rearranging the state pointer entries in one or more levels of the state pointer stack to cause the work items to be executed in a corresponding order.

14. The non-transitory computer readable medium of claim 13 wherein the control logic further comprises control logic instructions to:

dereference one of the state pointer entries when the conditional statement program instruction includes a reference to a local variable.

15. The non-transitory computer readable medium of claim 14 wherein the repacking further increments a level of the state pointer stack.

16. The non-transitory computer readable medium of claim 13 wherein the control logic further comprises control logic instructions to determine whether the program instruction is a first program instruction of an immediate post dominator basic block and to decrement the level of the state pointer stack when the program instruction is the first program instruction of the immediate post dominator basic block.

17. The non-transitory computer readable medium of claim 13 wherein the repacking further comprises:

packing the rearranged state pointer entries into the repacked wavefronts.

18. The non-transitory computer readable medium of claim 17 wherein the repacking further comprises determining whether the wavefronts are to be repacked based on at least one of a threshold value of threads active in the wavefronts, a memory affinity of each work item, an amount of divergence of a workgroup, and a relative resource use cost of running the repacking code.

19. The non-transitory computer readable medium of claim 13 wherein the control logic further comprises control logic instructions to allocate local data store memory for storing the plurality of local register states.

20. A computing system comprising:

a processor including control logic configured to:

store, in a memory, a plurality of register states, each register state associated with a corresponding one of a plurality of work items to be executed in single instruction multiple data hardware;

generate a state pointer stack, the state pointer stack comprising one or more levels of state pointer entries, each state pointer entry associated with a corresponding one of the work items and indicating a respective entry of the local register states;

analyze a conditional statement for at least some of the work items; and repack wavefronts that include the work items based on a result of the analyzing, wherein the repacking comprises rearranging the state pointer entries in one or more levels of the state pointer stack to cause the work items to be executed in a corresponding order.

21. The computing system of claim 20 wherein the control logic is further configured to:

generate a dereference to one of the state pointer entries responsive to a reference to a local variable.

22. The computing system of claim 21 wherein repacking the wavefronts includes incrementing a level of the state pointer stack.

23. The computing system of claim 22 wherein the control logic is further configured to determine whether the program instruction is a first instruction of an immediate post dominator basic block.

24. The computing system of claim 23 wherein the control logic is further configured to decrement the level of the state pointer stack when the program instruction is the first instruction of the immediate post dominator basic block.

25. The computing system of claim 20 wherein the control logic is further configured to:

pack the rearranged state pointer entries into the repacked wavefronts.

26. The computing system of claim 20 wherein the repacking further comprises repacking based on at least one of a threshold value of threads active in the wavefronts, a memory affinity of each work item, an amount of divergence of a workgroup, and a relative resource use cost of running the repacking code.

27. The computing system of claim 20 wherein the control logic is further configured to allocate local data store memory for storing the plurality of local register state.

* * * * *